(12) United States Patent
Conley

(10) Patent No.: US 9,677,618 B2
(45) Date of Patent: Jun. 13, 2017

(54) BEARING ASSEMBLY HAVING LABYRINTH SEAL WITH PUMPING ACTION

(71) Applicant: Lincoln Industrial Corporation, St. Louis, MO (US)

(72) Inventor: Paul G. Conley, St. Charles, MO (US)

(73) Assignee: Lincoln Industrial Corporation, St. Louis, MO (US)

( * ) Notice: Subject to any disclaimer, the term of this patent is extended or adjusted under 35 U.S.C. 154(b) by 47 days.

(21) Appl. No.: 14/725,798

(22) Filed: May 29, 2015

(65) Prior Publication Data

US 2016/0348725 A1    Dec. 1, 2016

(51) Int. Cl.
| | | |
|---|---|---|
| *F16C 33/80* | (2006.01) | |
| *F16C 35/04* | (2006.01) | |
| *F16J 15/447* | (2006.01) | |
| *F16C 33/66* | (2006.01) | |
| *F16C 33/78* | (2006.01) | |
| *F16C 23/08* | (2006.01) | |

(52) U.S. Cl.
CPC ............ *F16C 33/80* (2013.01); *F16C 35/047* (2013.01); *F16J 15/4472* (2013.01); *F16C 23/086* (2013.01); *F16C 33/6659* (2013.01); *F16C 33/7886* (2013.01)

(58) Field of Classification Search
CPC ...................................................... F16C 33/80
See application file for complete search history.

(56) References Cited

U.S. PATENT DOCUMENTS

| | | | | |
|---|---|---|---|---|
| 2,705,161 | A * | 3/1955 | Shafer ..................... | F16C 33/80 277/419 |
| 2,919,962 | A * | 1/1960 | Hencken ............. | F16C 33/6618 384/466 |
| 3,774,982 | A * | 11/1973 | Nakamura ........... | H02K 5/1732 384/480 |
| 5,993,068 | A * | 11/1999 | Suzuki .................. | F16C 33/785 384/450 |
| 2013/0068921 | A1* | 3/2013 | Ikeda ...................... | F16C 35/04 248/635 |
| 2016/0131190 | A1* | 5/2016 | Tsuchiya ................. | F16C 33/80 360/244.5 |

\* cited by examiner

*Primary Examiner* — Thomas R. Hannon
(74) *Attorney, Agent, or Firm* — Senniger Powers LLP

(57) ABSTRACT

A bearing assembly includes a housing having an interior cavity, an opening, and an inward facing seal mounting surface. The assembly includes a bearing and a shaft mounted in the bearing for rotation about a central axis. The assembly includes a seal positioned axially between the interior cavity and the exterior of the housing to inhibit contaminants from entering the housing and damaging the bearing. The seal has a bearing side, an opening side, and a gap surface facing a corresponding surface that is either an outward facing surface of the shaft or thee inward facing seal mounting surface of the housing. The gap surface is spaced from the corresponding surface by a clearance gap. The width of the clearance gap increases from the bearing side to the opening side to direct fluid in the clearance gap away from the interior cavity as the shaft rotates.

19 Claims, 13 Drawing Sheets

BEARING ASSEMBLY HAVING LABYRINTH SEAL WITH PUMPING ACTION

BACKGROUND

The present disclosure relates to bearing assemblies having labyrinth seals and more particularly to a bearing assembly having a labyrinth seal that purges contamination.

Conventional bearing assemblies include a housing, a bearing mounted in the housing, and a shaft mounted in the bearing for rotation relative to the housing. Seals are provided between the housing and shaft to prevent contaminants outside the housing from entering the housing and damaging the bearing. As will be appreciated by those skilled in the art, relative motion occurs between the seal and either the shaft or the housing, which causes wear. In order to reduce seal wear, the seal is pressed onto either the housing or the shaft and a small gap is provided between the other element. For example, if the seal is pressed into a seat formed in the housing, a small clearance gap is provided between the seal and the shaft so the seal and the shaft do not contact as the shaft turns in the seal. This reduces seal wear and increases the life of the bearing assembly.

Lubricant is introduced into the housing of the bearing assembly to reduce wear and friction between the moving parts. During operation, the lubricant in the housing is pressurized to prevent contaminants from entering the housing through the clearance gap where the contaminants could damage the bearing and reduce bearing assembly life. However, under some conditions, the lubricant pressure can drop, permitting contaminants to enter the housing through the clearance gap, damaging the bearing and significantly reducing the life of the bearing assembly. Thus, there is a need for a non-contact seal (i.e., a seal providing a clearance gap) that purges contaminants from the clearance gap regardless of lubricant pressure in the housing.

SUMMARY

In one aspect, a bearing assembly comprises a housing having an interior cavity adapted to connect with a lubricant source, an opening extending from the interior cavity to an exterior of the housing, an inward facing seal mounting surface, and an inward facing bearing seat. The bearing assembly also includes a bearing positioned in the interior cavity of the housing and having a central axis. The bearing includes an outer race mounted in the inward facing bearing seat of the housing and an inner race centered on the central axis and freely rotatable in the outer race. Further, the bearing assembly comprises a shaft mounted in the inner race of the bearing for rotation with the inner race about the central axis of the bearing. The shaft has a radially outward facing surface extending along the shaft from the interior cavity through the opening to the exterior of the housing. In addition, the bearing assembly includes a seal mounted around the radially outward facing surface of the shaft and positioned axially along the shaft between the interior cavity of the housing and the exterior of the housing to inhibit contaminants from entering the interior cavity of the housing and damaging the bearing. The seal includes an annular body having a bearing side facing the bearing and an opening side opposite the bearing side. The seal also includes a gap surface facing a corresponding surface. The corresponding surface is either the radially outward facing surface of the shaft or the inward facing seal mounting surface of the housing. The gap surface is spaced from the corresponding surface by a clearance gap having a predetermined axially varying width. The width of the clearance gap increases from the bearing side to the opening side to direct fluid in the clearance gap away from the interior cavity as the shaft rotates relative to the housing.

In another aspect, a bearing assembly comprises a housing having an interior cavity adapted to connect with a lubricant source, an opening extending from the interior cavity to an exterior of the housing, an inward facing seal mounting surface, and an inward facing bearing seat. The bearing assembly also includes a bearing positioned in the interior cavity of the housing and having a central axis. The bearing includes an outer race mounted in the inward facing bearing seat of the housing and an inner race centered on the central axis and freely rotatable in the outer race. Further, the bearing assembly comprises a shaft mounted in the inner race of the bearing for rotation with the inner race about the central axis of the bearing. The shaft has a radially outward facing surface extending along the shaft from the interior cavity through the opening to the exterior of the housing. In addition, the bearing assembly includes a seal mounted around the radially outward facing surface of the shaft and positioned axially along the shaft between the interior cavity of the housing and the exterior of the housing to inhibit contaminants from entering the interior cavity of the housing and damaging the bearing. The seal includes an annular body having a bearing side facing the bearing and an opening side opposite the bearing side. The seal also includes a gap surface facing the radially outward facing surface of the shaft. The gap surface is spaced from the radially outward facing surface of the shaft by a clearance gap having a predetermined axially varying width. The width of the clearance gap increases from the bearing side to the opening side to direct fluid in the clearance gap away from the interior cavity as the shaft rotates relative to the housing.

In still another aspect, a bearing assembly comprises a housing having an interior cavity adapted to connect with a lubricant source, an opening extending from the interior cavity to an exterior of the housing, an inward facing seal mounting surface, and an inward facing bearing seat. The bearing assembly also includes a bearing positioned in the interior cavity of the housing and having a central axis. The bearing includes an outer race mounted in the inward facing bearing seat of the housing and an inner race centered on the central axis and freely rotatable in the outer race. Further, the bearing assembly comprises a shaft mounted in the inner race of the bearing for rotation with the inner race about the central axis of the bearing. The shaft has a radially outward facing surface extending along the shaft from the interior cavity through the opening to the exterior of the housing. In addition, the bearing assembly includes a seal mounted around the radially outward facing surface of the shaft and positioned axially along the shaft between the interior cavity of the housing and the exterior of the housing to inhibit contaminants from entering the interior cavity of the housing and damaging the bearing. The seal includes an annular body having a bearing side facing the bearing and an opening side opposite the bearing side. The seal also includes a gap surface facing the inward facing seal mounting surface of the housing. The gap surface is spaced from the inward facing seal mounting surface by a clearance gap having a predetermined axially varying width. The width of the clearance gap increases from the bearing side to the opening side to direct fluid in the clearance gap away from the interior cavity as the shaft rotates relative to the housing.

Other objects and features will be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

Figure 1:
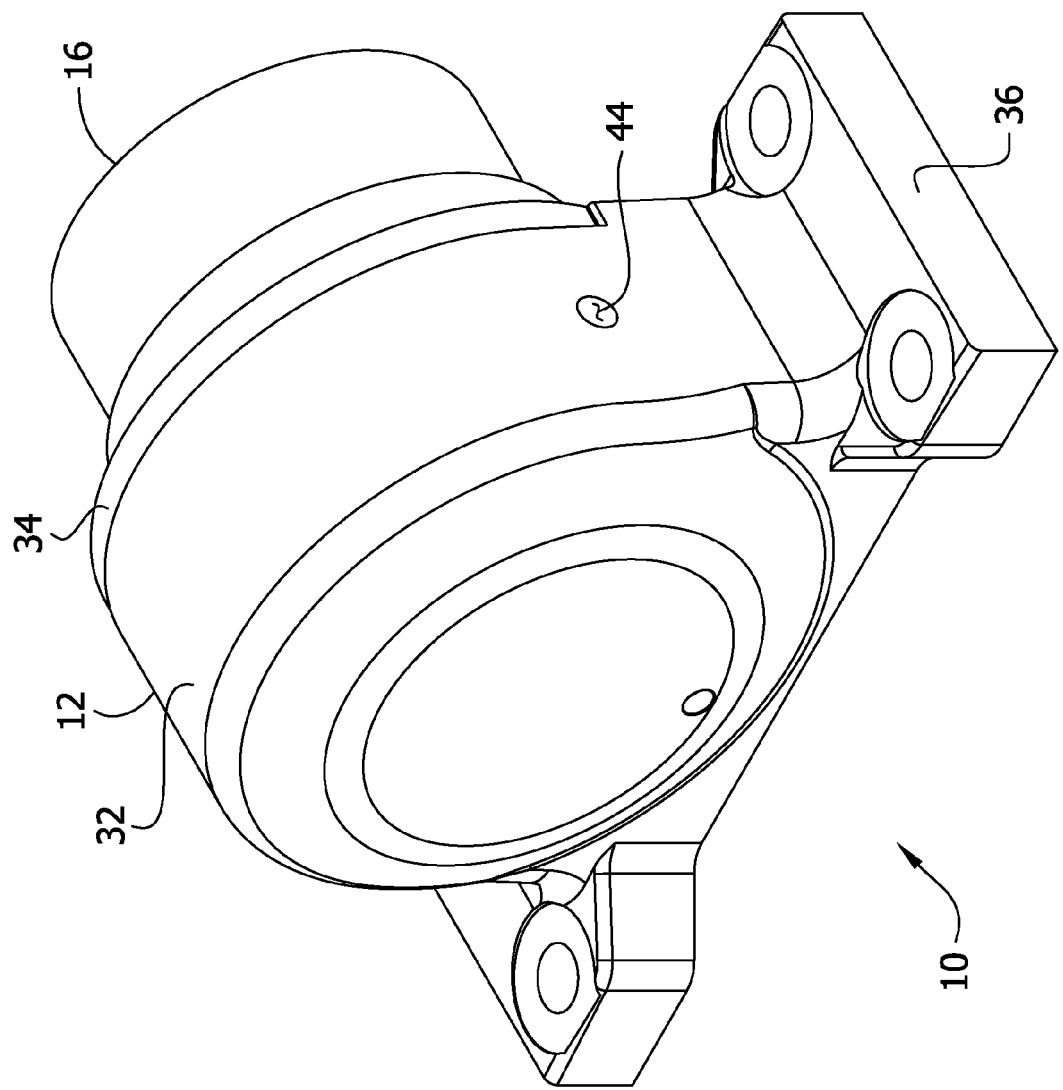
FIG. 1 is a fragmentary perspective of a bearing assembly of a first embodiment.
Figure 2:
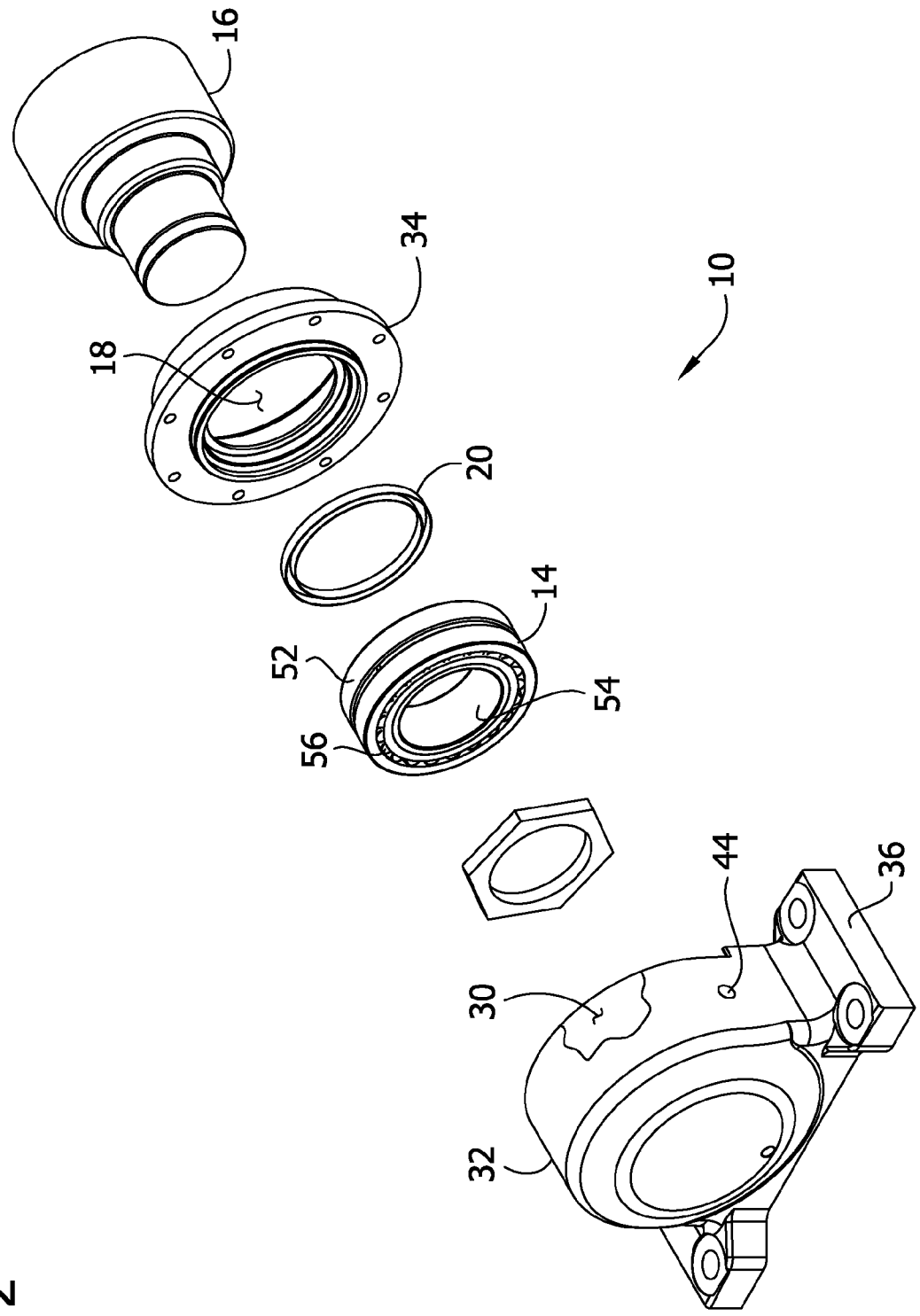
FIG. 2 is a separated perspective of the bearing assembly of FIG. 1.
Figure 3:
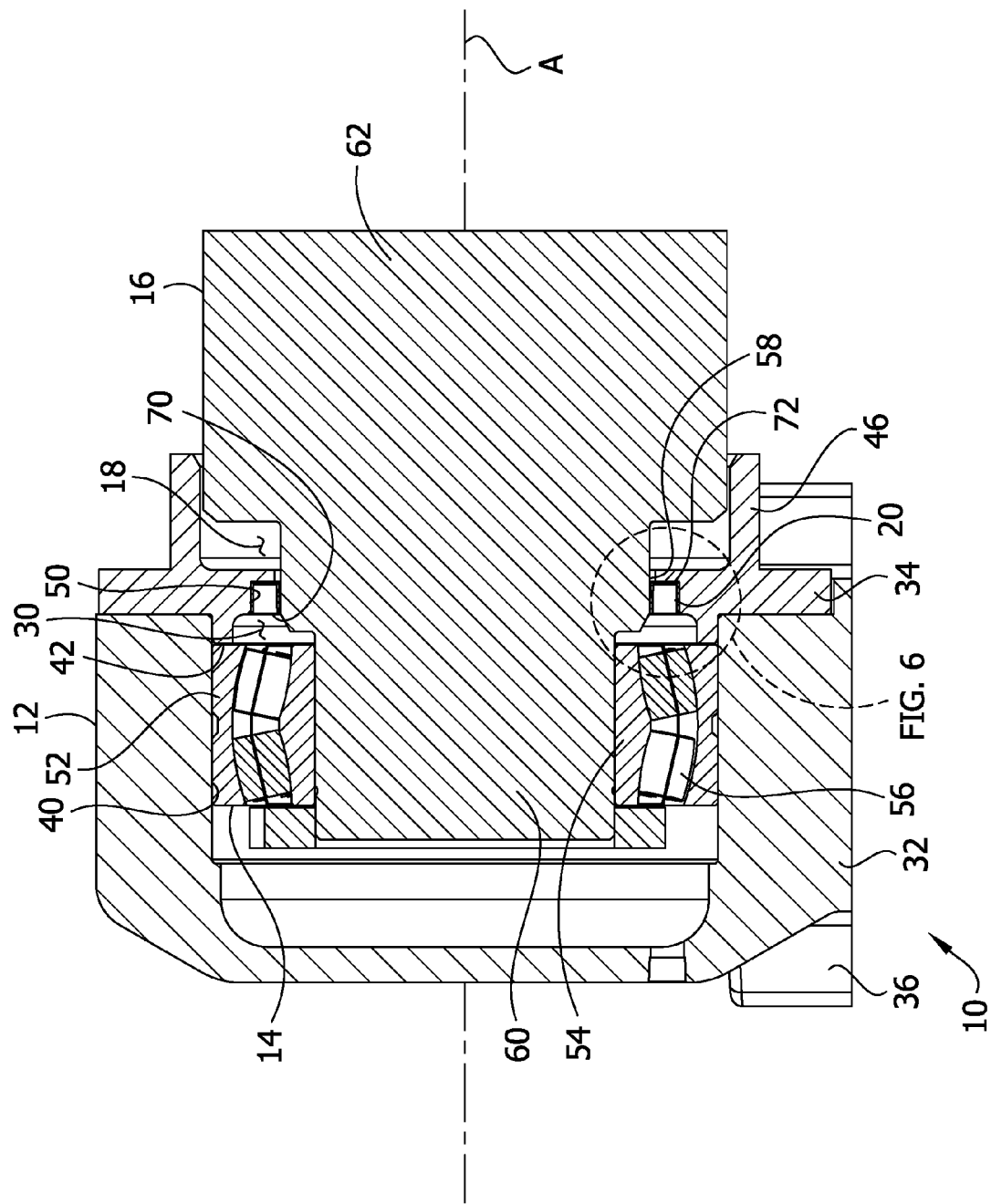
FIG. 3 is a cross section of the bearing assembly of FIG. 1.

Referring to FIGS. 1-3, a bearing assembly is generally indicated in its entirety by reference number 10. The bearing assembly 10 includes a housing 12 supporting a bearing (e.g., a double row spherical roller bearing). The housing 12 is suitably configured to be mounted in a mechanical apparatus (not shown) to support a shaft 16 for rotation. The shaft 16 is mounted in the bearing 14 to rotate relative to the housing 12. A free end of the shaft 16 extends through an opening 18 in the housing 12 to operatively connect to a rotating part in the mechanical apparatus. A labyrinth seal 20 is positioned on the shaft 16 adjacent to the opening 18 to inhibit contaminants from entering the housing 12 through the opening and damaging the bearing 14. As will be explained below, the seal 20 effectively inhibits the ingress of contaminants into the housing 12 by generating a pumping force that drives the contaminants toward an exterior of the housing.

The housing 12 is shaped and arranged to be mounted in the mechanical apparatus where the housing substantially encloses the roller bearing 14 in a protected interior cavity 30. In the illustrated embodiment, the housing 12 is a two-piece assembly having a bearing enclosure member 32 and a shaft receiving member 34. The bearing enclosure member 32 and the shaft receiving member 34 are each made from a suitable metal or other type material. The shaft receiving member 34 is fastened to the bearing enclosure member 32 to form the housing. More specifically, an outwardly extending flange portion of the shaft receiving member 34 adjoins an end surface of the bearing enclosure member 32. The bearing enclosure member 32 includes a pair of mounting feet 36 configured to mount the bearing assembly 10 in the mechanical apparatus where the housing 12 is a fixed part. Although the illustrated housing is a two-piece construction, it will be understood that other configurations may be used without departing from the scope of the invention. However, in general, suitable bearing assembly housings will define an interior cavity for receiving a bearing and a shaft opening for receiving a rotatable shaft.

The housing 12 defines the interior cavity 30, which is sized and arranged to receive the bearing 14. In the illustrated embodiment, the bearing enclosure member 32 of the housing 12 defines a radially inward facing bearing seat 40 for retaining the bearing 14 and preventing it from moving transverse to a central axis A of the bearing. The shaft receiving member 34 includes an axially rearward facing bearing seat 42 configured to engage the bearing 14 and inhibit the bearing from moving axially in the housing 12 toward the opening 18. The interior cavity 30 is in fluid communication with a lubricant source (not shown) that provides lubricant to the bearing 14. The illustrated bearing enclosure member 32 has an inlet 44 for receiving the lubricant. In some embodiments, the inlet 44 is adapted to be connected to an automatic lubrication system that periodically supplies lubricant to the interior cavity 30 of the housing 12 to lubricate the bearing 14. The interior cavity 30 of the housing 12 is substantially filled with lubricant during operation to minimize wear on the bearing. As will be discussed in further detail below, the lubricant may be pressurized to prevent contaminants from entering the interior cavity 30 through the opening 18.

The opening 18 in the housing 12 extends between the interior cavity 30 and the exterior of the housing. In the illustrated embodiment, the shaft receiving member 34 defines the opening 18. The opening 18 is sized and shaped to receive a portion of the shaft 16 and provide a small clearance to permit the shaft to freely rotate in the opening. In some embodiments, the clearance between the housing 12 and the shaft 16 is minimized to reduce the likelihood of contaminants entering the interior cavity 30. The shaft receiving member 34 of the illustrated embodiment includes an axially extending collar 46 that surrounds a larger diameter portion of the shaft outside of the interior cavity. A small clearance is provided between the collar 46 and the shaft 16 to further inhibits contaminants from entering the interior cavity 30.

The housing 12 is configured to mount the labyrinth seal 20 adjacent the opening 18 between the interior cavity 30 and the exterior of the housing. The housing 12 defines a radially inward facing seal mounting surface 50 sized to receive the seal 20 and secure it in the proper position relative to the shaft opening 18. In the illustrated embodiment, the shaft receiving member 34 of the housing 12 defines the seal mounting surface 50, but in other embodiments the seal mounting surface may be defined by other portions of the housing without departing from the scope of the invention.

The bearing 14 supports the shaft 16 for rotation relative to the housing 12. The bearing 14 includes an outer race 52 mounted in the inward facing bearing seat 40. In the illustrated embodiment, the outer race 52 also engages the rearward facing bearing seat 42 to position the bearing 14 axially in the housing 12. An inner race 54 centered on a central axis A of the bearing 14 freely rotates within the outer race 52. The inner race 54 is an annular body that extends around the shaft 16. The inner race 54 is mounted on the shaft 16 for mutual rotation with the shaft. The bearing 14 includes a plurality of rolling elements 56 positioned between the races 52, 54. As the inner race 54 rotates in the outer race 56 about the central axis A of the bearing 14, the rolling elements 56 roll along the inward facing surface of the outer race and the outward facing surface of the inner race to permit free rotation between the races. The rolling elements 56 are preferably configured and arranged to inhibit the inner race 54 from moving parallel to the central axis A relative to the outer race 52. Although the illustrated bearing 14 is a double row spherical roller bearing, those skilled in the art will appreciate that other types of bearings may be used without departing from the scope of the present invention.

The shaft 16 extends through the opening 18 in the housing 12 but does not contact the housing. The shaft 16 has a radially outward facing surface 58 extending along the shaft from the interior cavity 30 of the housing 12 to the exterior of the housing. The outward facing surface 58 of the shaft 16 opposes a radially inward facing surface of the shaft receiving member 34 when the shaft extends through the shaft opening 18. In the illustrated embodiment, the outward facing surface 58 of the shaft 16 is an annular surface oriented substantially parallel to the central axis of the bearing 14. The shaft 16 extends through the labyrinth seal 20 without contacting the seal. As will be discussed in greater detail below, the radially outward facing surface 58 is spaced from the labyrinth seal 20 in a configuration that directs fluid between the seal and the shaft 16 outward away from the interior cavity 30 and toward the exterior of the housing 12. A first end portion 60 of the shaft 16 is received in the housing 12, and an opposite second or free end portion 62 of the shaft extends out from the housing 12 through the collar 46. The free end portion 62 is configured to be connected to a rotating portion of the mechanical apparatus in which the bearing assembly 10 is installed.

The shaft 16 is installed in the bearing 14 for rotation relative to the housing 12 about the center axis A of the bearing 14. In some embodiments, the inner race 54 of the bearing 14 is press fit on the shaft 16 so the shaft rotates mutually with the inner race about the central axis. Further, in some embodiments, the shaft 14 is adapted to rotate at a speed in a range of about 50 rpm to about 2000 rpm, but the shaft may rotate at other speeds without departing from the scope of the present invention.

The labyrinth seal 20 is mounted on the radially outward facing surface 58 of the shaft 16 and positioned axially between the interior cavity 30 of the housing 12 and the exterior of the housing to inhibit contaminants from entering the interior cavity and damaging the bearing 14. The seal 20 includes an annular body having a bearing side 70, which faces the bearing 14 and the interior cavity 30 of the housing 12, and an opening side 72, which faces opposite the bearing when the seal is installed in the bearing assembly 10. The seal 20 also includes a gap surface 74 that faces the radially outward facing surface 58 of the shaft 16 and defines a clearance gap 76 between the shaft and the seal. As will be discussed in further detail below, the gap surface 74 of the seal is oriented relative to the radially outward facing surface 58 of the shaft 16 to direct lubricant in the gap between the shaft and seal away from the interior cavity 30 and toward the exterior of the housing 12 as the shaft rotates. The seal 20 is mounted in the housing 12 (e.g., press fit) and does not contact the shaft 16. Thus, the seal 20 is a non-contact seal.

Figure 4:
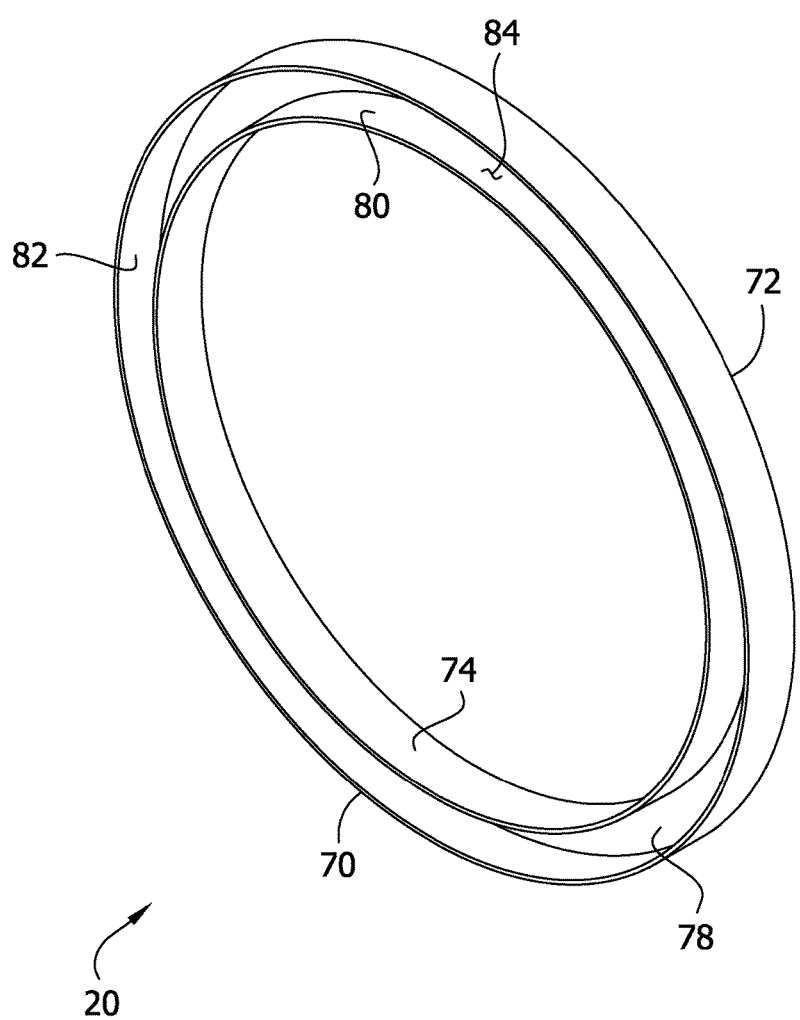
FIG. 4 is a perspective of a labyrinth seal of the bearing assembly of FIG. 1.
Figure 5:
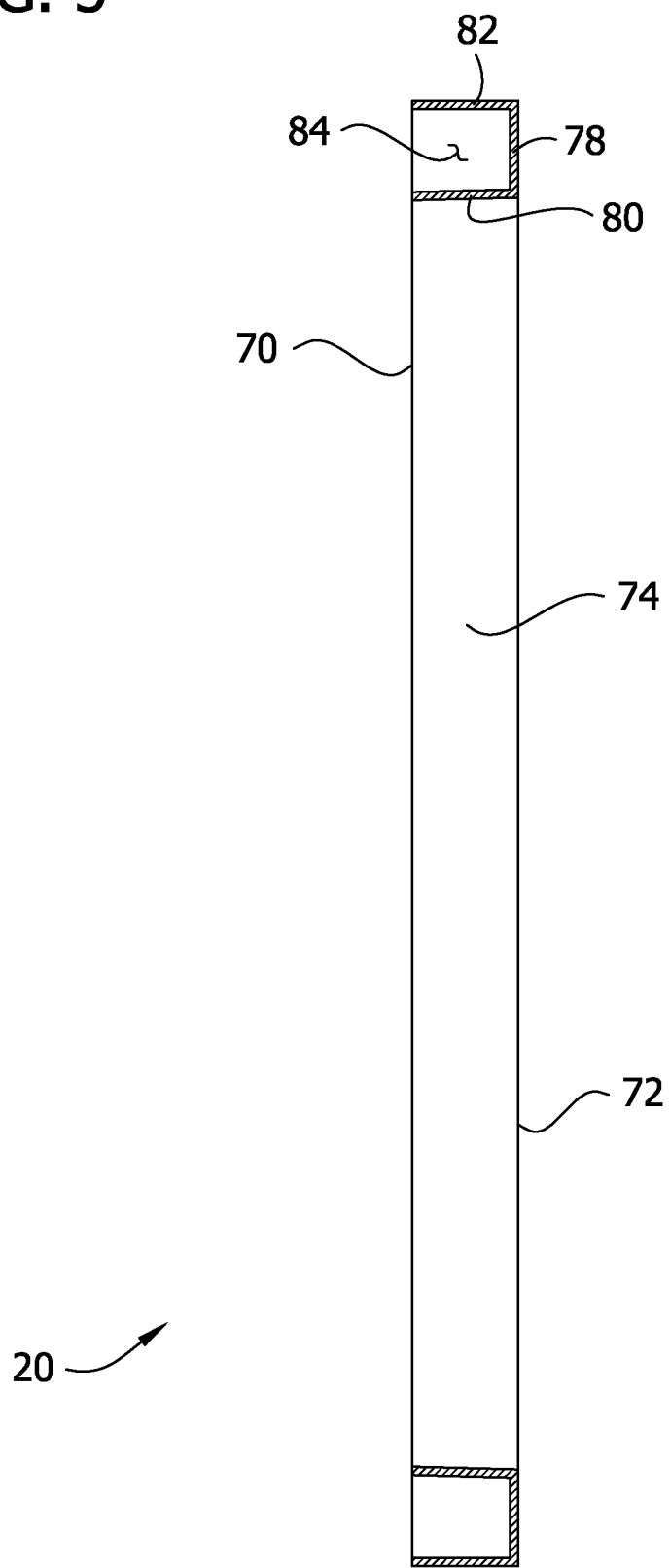
FIG. 5 is a cross-sectional elevation of the seal of the bearing assembly of FIG. 1.

Referring to FIGS. 4 and 5, the seal 20 is a one piece annular metal body. However, other materials and constructions may also be used without departing from the scope of the present invention. The seal 20 includes an end wall 78 extending radially from an inner end of the annular body to an outer end of the annular body. The end wall 78 is oriented toward the opening side 72 of the seal 20 in the illustrated embodiment. An annular inner wall 80 extends axially toward the interior cavity 30 from the inner end of the end wall 78 and an annular outer wall 82 extends axially toward the interior cavity from the outer end of the end wall. Together, the end wall 78, inner wall 80, and outer wall 82 define an annular space 84 in the seal 20, spacing the inner wall from the outer wall. The annular space 84 extends axially into the bearing side 70 of the seal 20 so the bearing side of the seal has an annular opening. In the illustrated embodiment, the outer wall 82 is secured to the seal mounting surface 50, and the inner wall defines the gap surface 74.

Figure 6:
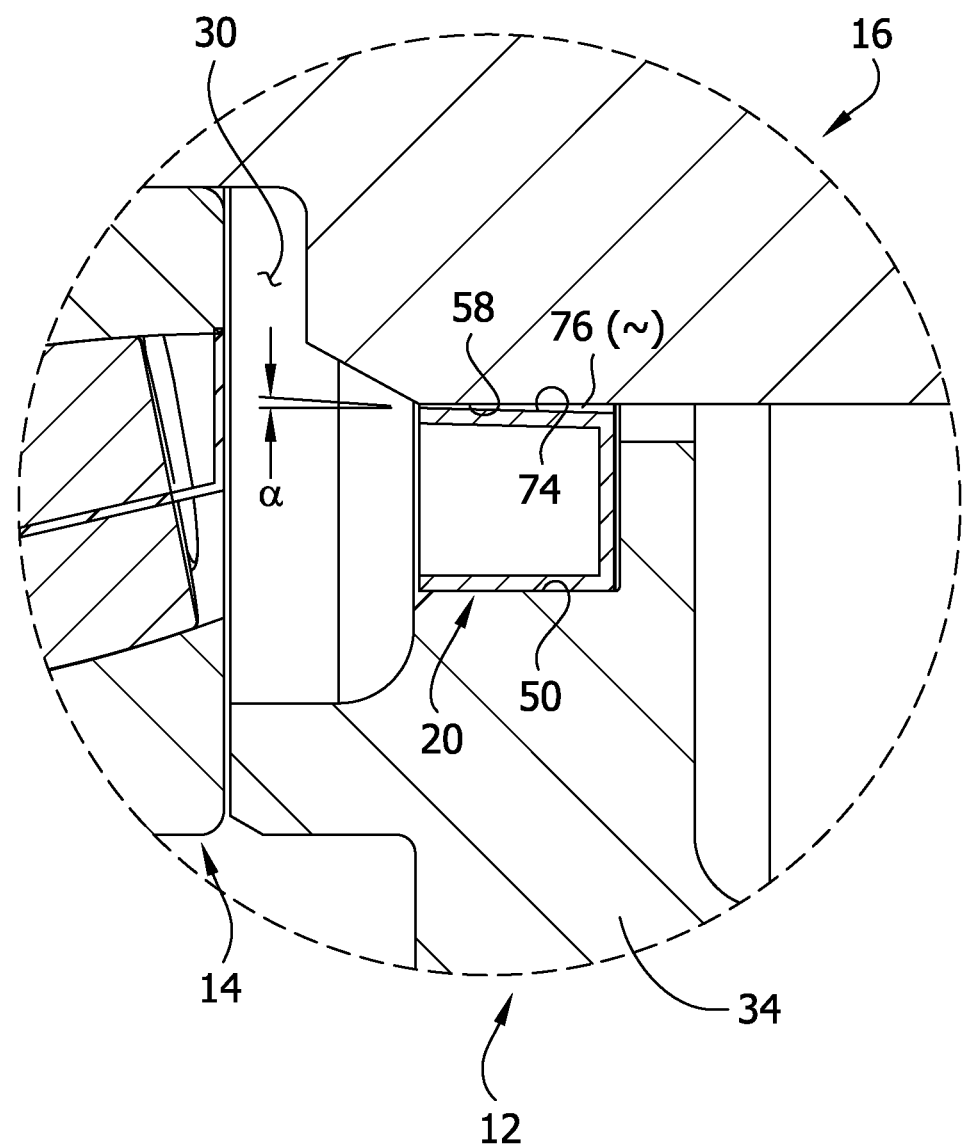
FIG. 6 is detail of a portion of FIG. 3.

Referring to FIG. 6, the inner wall 80 of the seal 20, which partially defines the gap surface 74, is oriented so the gap surface slopes radially outward from the bearing side 70 to the opening side 72. The sloped gap surface 74 defines a clearance gap 76 having an axially varying width. The illustrated gap surface 74 is sloped at an angle $\alpha$ in a range of about 1.3° to about 5.0° relative to the central axis A of the bearing 14. In some embodiments, the gap surface 76 is sloped at an angle $\alpha$ of about 1.35° relative to the central axis of the bearing 14. It is believed the gap surface may be sloped at other angles relative to the central axis without departing from the scope of the present invention.

The width of the clearance gap 76 increases from the bearing side 70 of the seal 20 to the opening side 72 of the seal). In the illustrated embodiment, the clearance gap 76 at the opening side 72 of the seal 20 has a width of about 0.02 inches (0.0508 cm). The clearance gap 76 at the bearing side 70 of the seal 20 has a width of about 0.01 inches (0.0254 cm). In other embodiments, it is believed the clearance gap 76 may have different dimensions without departing from the scope of the invention. For example, in some embodiments, at the bearing side 70 of the seal 20 the clearance gap 76 has a width in a range of about 0.005 inches (0.0127 cm) to about 0.025 inches (0.0635 cm). In some other embodiments, at the opening side 72 of the seal the clearance gap 76 has a width in a range of about 0.010 (0.01270 cm) inches to about 0.050 inches (0.1270 cm). It is envisioned that in some embodiments a ratio of clearance gap widths from the opening side to bearing side is greater than about 2:1 and more particularly about 2:1.

Figure 7:
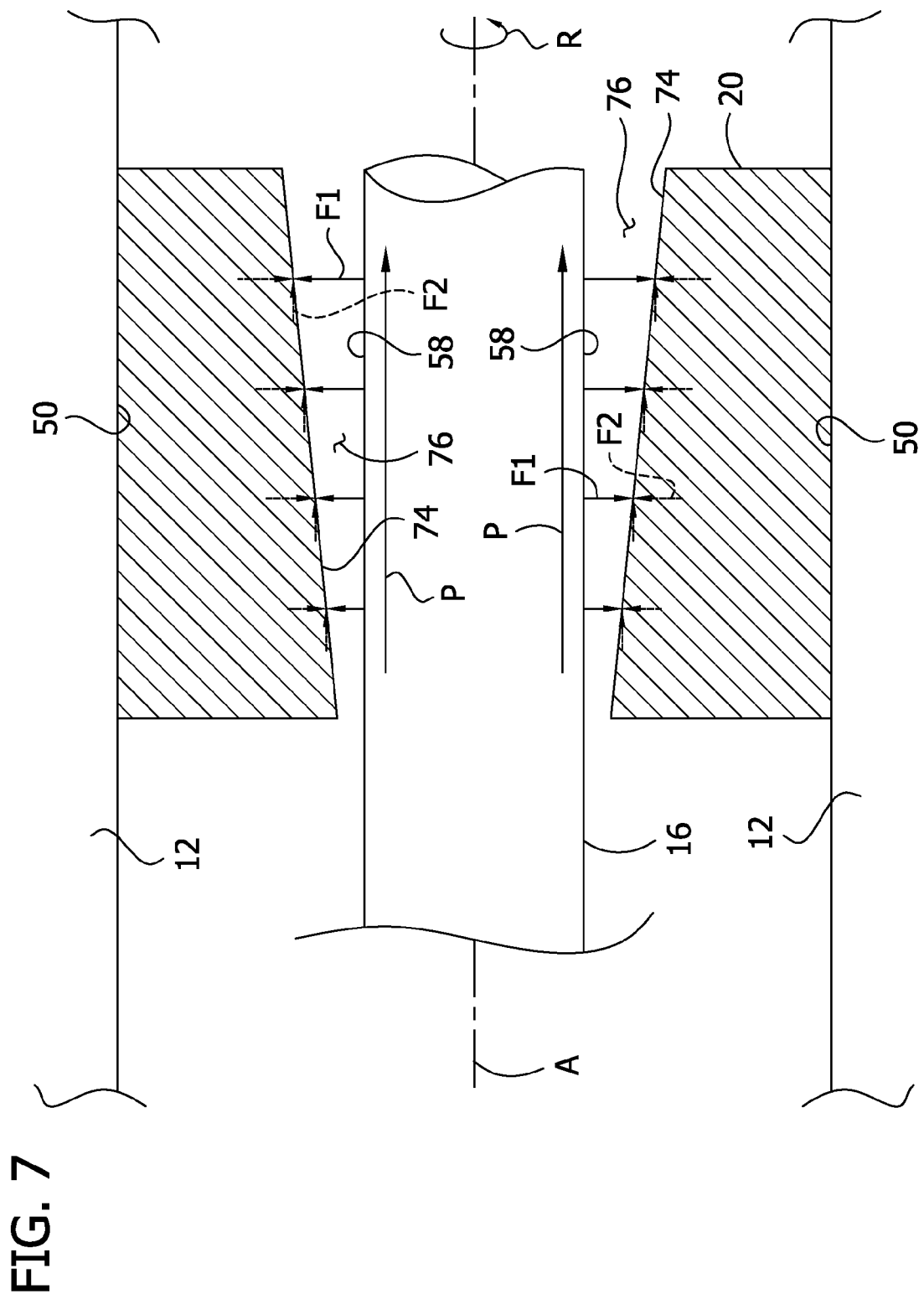
FIG. 7 is a schematic fragmentary cross section illustrating forces exerted on fluid in a gap between a shaft of the bearing assembly and the seal.
Figure 8:
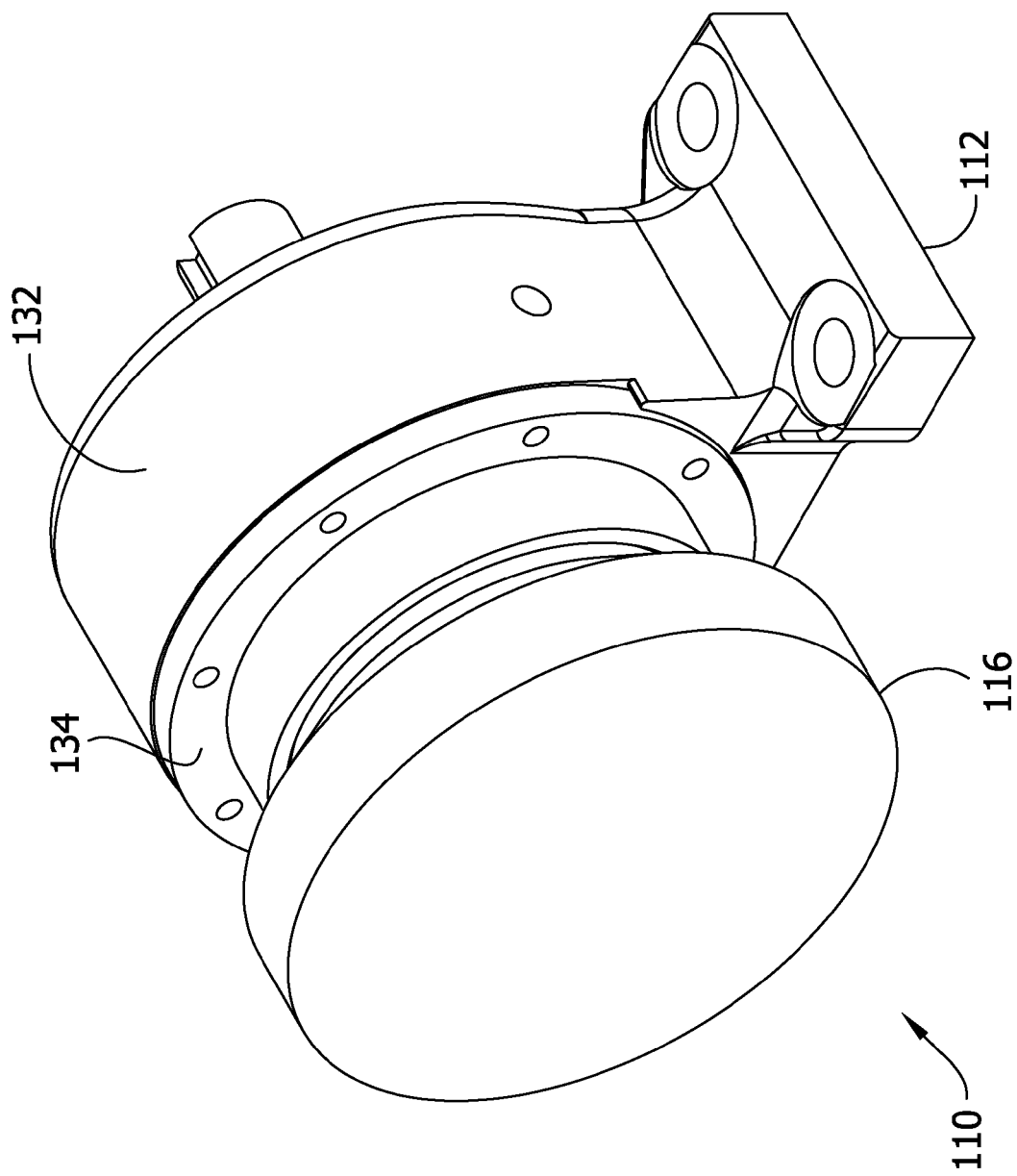
FIG. 8 is a fragmentary perspective of a bearing assembly of a second embodiment.
Figure 9:
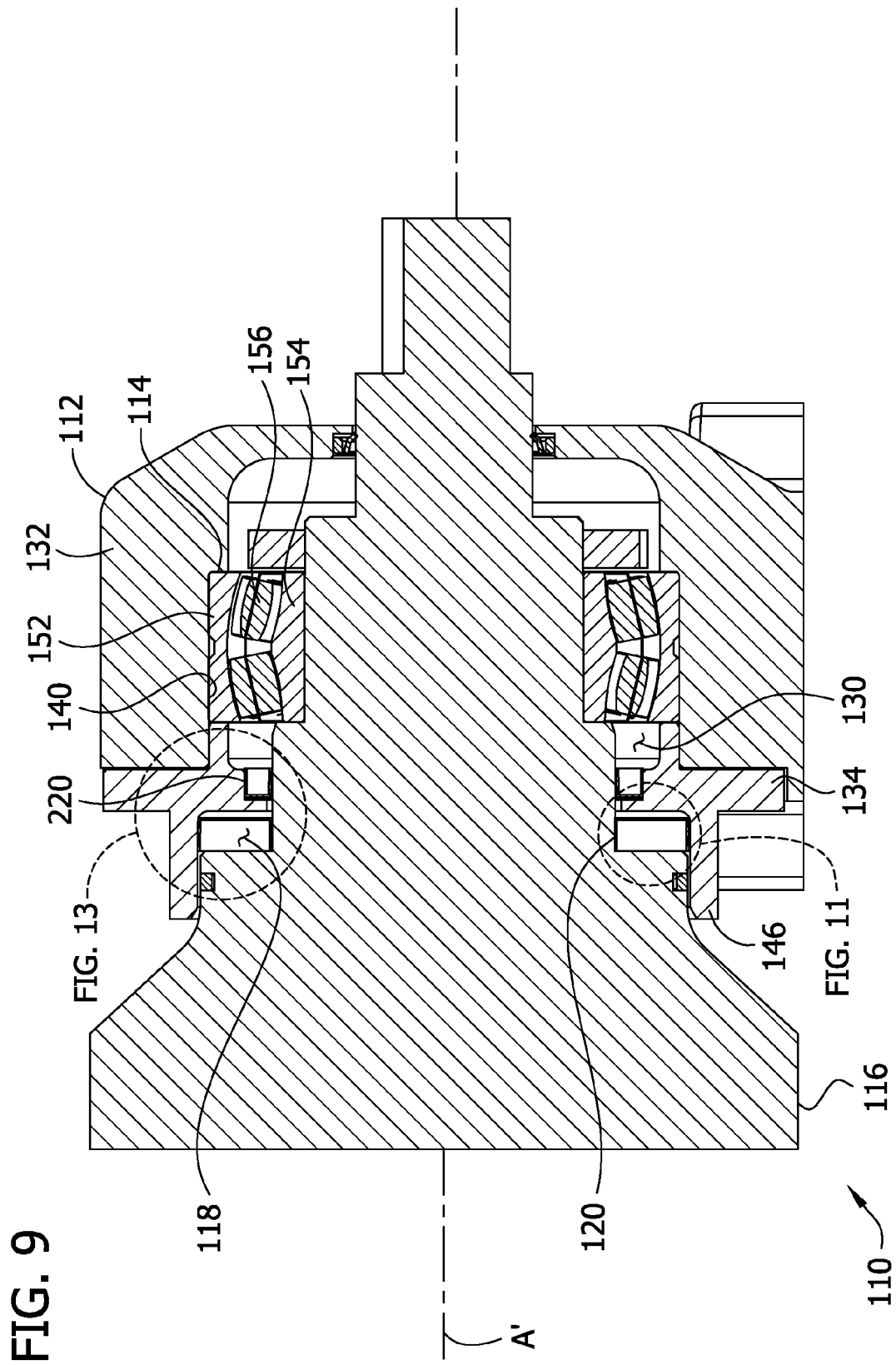
FIG. 9 is a cross section of the bearing assembly of FIG. 8.

Referring to FIG. 7, in use the seal 20 is configured to generate a net axial force that pumps fluid in the clearance gap 76 outward in a pumping direction P toward the exterior of the housing 12. In the illustrated embodiment, the shaft 16 rotates in the housing 12 in a rotational direction R. Typically, a lubrication system pressurizes lubricant in the interior cavity 30 of the housing 12 so lubricant fills the clearance gap 76 between the seal 20 and the shaft 16. As the shaft 16 rotates, the seal 20 remains stationary, creating a moving boundary condition at the radially outward facing surface of the shaft 58 and a non-moving boundary condition at the gap surface 74. A velocity gradient forms in the fluid across the width of the clearance gap 76, ranging from the boundary at the shaft 16, at which the fluid velocity matches the velocity of the shaft, to the boundary at the seal 20, at which the fluid velocity is substantially equal to zero. This velocity gradient generates shear stress in the fluid, which tends to impart a force F1 on the boundary surfaces in a direction normal to each boundary surface. Because the outer gap surface 74 is sloped, the resultant forces F2 include an axial component directed in the pumping direction P. Even though the gap surface 74 is only slightly angled relative to the central axis of the bearing 14, the resulting forces F2 on the lubricant are sufficient to pump the lubricant in the pumping direction P because the shaft 16 rotates at a relatively high speed. Any contaminants contained in the clearance gap 76 are pumped with the lubricant in the pumping direction P away from the interior cavity 30.

Referring to FIGS. 8-11, another embodiment of a bearing assembly is generally indicated by reference number 110. The bearing assembly 110 is substantially similar to the bearing assembly 10, except for the differences that are, in part, apparent and, in part, pointed out below. Features of the bearing assembly 110 of the second embodiment that correspond with features of the bearing assembly 10 of the first embodiment are given a similar reference number plus 100. Like the bearing assembly 10, the bearing assembly 110 includes a housing 112 that supports a roller bearing 114 and a shaft 116 extending through an opening 118 in the housing and mounted in the roller bearing 114 for rotation relative the housing. Whereas the bearing assembly 10 includes a labyrinth seal 20 that is press fit in the seal mounting surface 50 of the housing 12 and has a clearance gap 76 between the gap surface 74 of the seal and the radially outward facing surface 58 of the shaft 16 (i.e., the seal 20 is housing mounted), the bearing assembly 110 of the second embodiment includes a primary labyrinth seal 120 mounted on the radially outward facing surface 158 of the shaft 116 (e.g., press fit) and having a clearance gap 176 between an outwardly facing gap surface 174 and an inward facing seal mounting surface 150 of the housing 112. That is, the seal 120 of the second embodiment is a shaft-mounted seal. Further, the bearing assembly 110 includes a secondary labyrinth seal 220 that is substantially similar to the labyrinth seal 20 of the bearing assembly 10. The labyrinth seal 220 is mounted in a seal mounting surface 250 defined by the housing 112 so the seal forms a clearance gap 276 between an inwardly facing gap surface 274 and the outwardly facing surface 158 of the shaft 116. That is, the seal 220 is a housing-mounted seal. Though the illustrated bearing assembly 110 uses primary and secondary seals 120, 220, those skilled in the art will appreciate that the bearing assembly may use a single seal mounted on the shaft and having a gap surface defining a clearance gap with an inwardly facing surface of the housing without departing from the scope of the invention.

The bearing assembly housing 112 is constructed similar to the bearing assembly housing 12. Like the housing 12, the housing 112 includes a bearing enclosure member 132 and a shaft receiving member 134 that define an interior cavity 130 adapted to fluidly connect with a lubricant source (e.g., an automated lubrication system). The bearing enclosure member 132 defines an inward facing bearing seat 140 adapted to mount the bearing 114 within the interior cavity 130 of the housing 112. The shaft receiving member 134 of the housing 112 defines the opening 118, which extends from the interior cavity 130 to the exterior of the housing. The shaft receiving member 134 includes an axially extending collar 146 that extends around an enlarged diameter portion of the shaft 116. The collar 146 provides a first inward facing seal mounting surface 150 that receives the primary labyrinth seal 120. The shaft receiving member 134 also includes a radially inward extending portion that forms a second inward facing seal mounting surface 250 for receiving the secondary labyrinth seal 220.

The bearing 114 is positioned in the interior cavity 130 of the housing 112 to support the shaft 116 for rotation about a central axis A' of the bearing. Like the bearing 14, the bearing 114 includes an outer race 152 mounted (e.g., press fit) in the inward facing bearing seat 140 of the housing 112. The bearing 114 also includes an inner race positioned in the outer race 152 and centered on the central axis A' of the bearing. The inner race 154 freely rotates in the outer race. The inner race 154 is mounted (e.g., press fit) on the shaft 116 for mutual rotation with the shaft. Like the bearing 14 of the first embodiment, the bearing 114 of the second embodiment is a double row spherical roller bearing having pairs of roller elements 156 spaced circumferentially around the annular gap between the inner race 154 and the outer race 152. The roller elements 156 roll along the inward facing surface of the outer race 152 and the outward facing surface of the inner race 154 to permit substantially free rotation of the inner race relative to the outer race.

The shaft 116 is mounted in the inner race 154 for rotation with the inner race about the central axis A' of the roller bearing 114. The shaft 116 includes a radially outward facing surface 158, which extends through the shaft opening 118 in the housing from the interior cavity 130 to the exterior of the housing. The shaft 116 is sized to mount the primary labyrinth seal 120 on the radially outward facing surface 158 for mutual rotation with the shaft about the central axis A' of the bearing 114. The shaft 116 is further sized to be received in the secondary labyrinth seal 220 so the radially outward facing surface of the shaft 158 is spaced from the gap surface 274.

The primary labyrinth seal 120 is mounted around the radially outward facing surface 158 of the shaft 116 and positioned axially between the interior cavity 130 of the housing 112 and the exterior of the housing to inhibit contaminants from entering the interior cavity and damaging the bearing 114. The seal 120 includes an annular body having a bearing side 170, facing toward the bearing 114 and interior cavity 130, and an opening side 172, facing away from the bearing when the seal is installed in the bearing assembly 110. The seal 120 also includes a radially outward facing gap surface 174 that faces the inward facing seal mounting surface 150 of the housing 112 and defines a clearance gap 176 between the housing and the seal. As will be discussed in further detail below, the gap surface 174 of the primary labyrinth seal 120 is positioned relative the inward facing seal mounting surface 150 of the housing 112 to direct fluid in the clearance gap 176 toward the exterior of the housing as the shaft 116 and seal rotate together in the housing. The seal 120 is mounted on the shaft 116 and does not contact the housing 112. Thus, the seal 20 is a non-contact seal.

Figure 10:
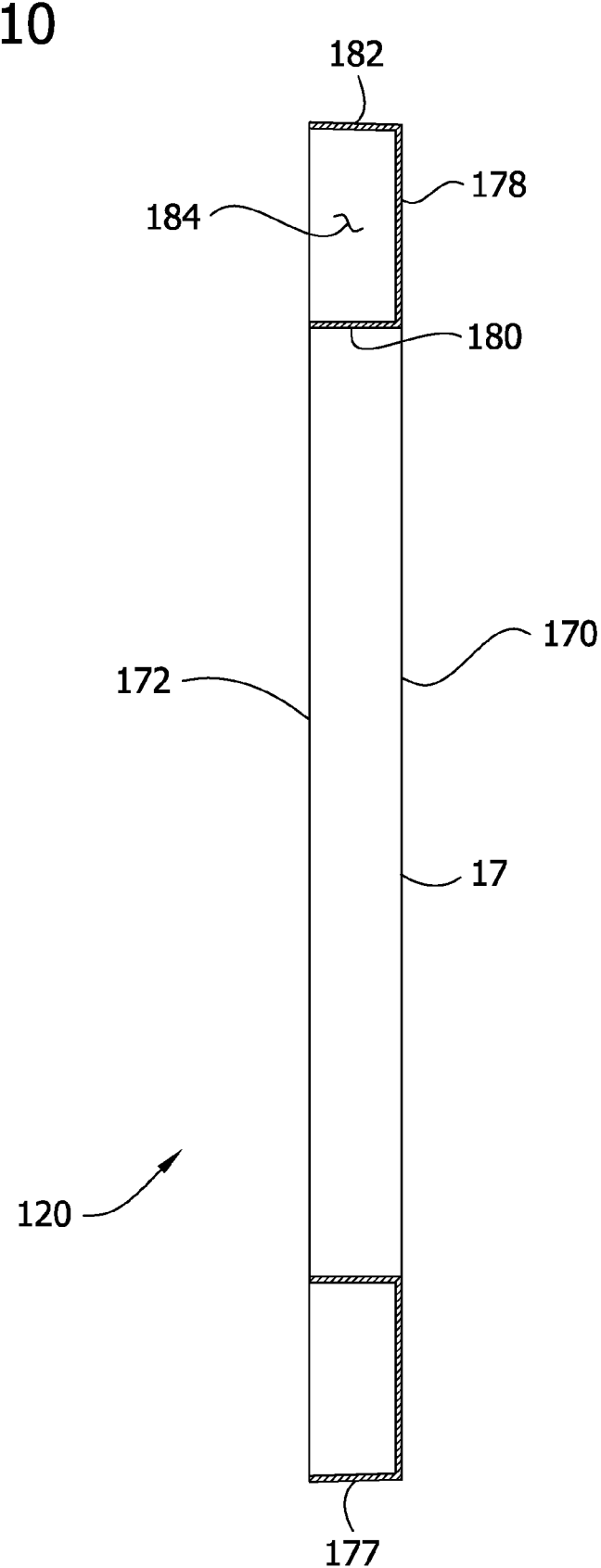
FIG. 10 is a cross-sectional elevation of the seal of the bearing assembly of FIG. 8.

Referring to FIG. 10, the primary labyrinth seal 120 has a one piece annular body of metal. It is envisioned that other materials and constructions may also be used without departing from the scope of the present invention. The illustrated seal 120 includes an end wall 178 extending radially from an inner end of the annular body to an outer end of the annular body. The end wall 178 is positioned at the bearing side 170 of the seal 20 in the illustrated embodiment. An annular inner wall 180 extends axially from the radially inner end of the end wall 178, and an annular outer wall 182 extends axially from the radially outer end of the end wall. Together, the end wall 178, inner wall 180, and outer wall 182 define an annular space 184 in the seal 120. The annular space 184 separates the inner wall 180 from the outer wall 182. The annular space 184 extends axially from the opening side 172 of the seal 120 such that the opening side of the seal includes an annular opening to the annular space. In the illustrated embodiment, the inner wall 180 of the seal 120 is secured to the radially outward facing surface of the shaft 116, and the outer wall 182 defines the gap surface 174.

Figure 11:
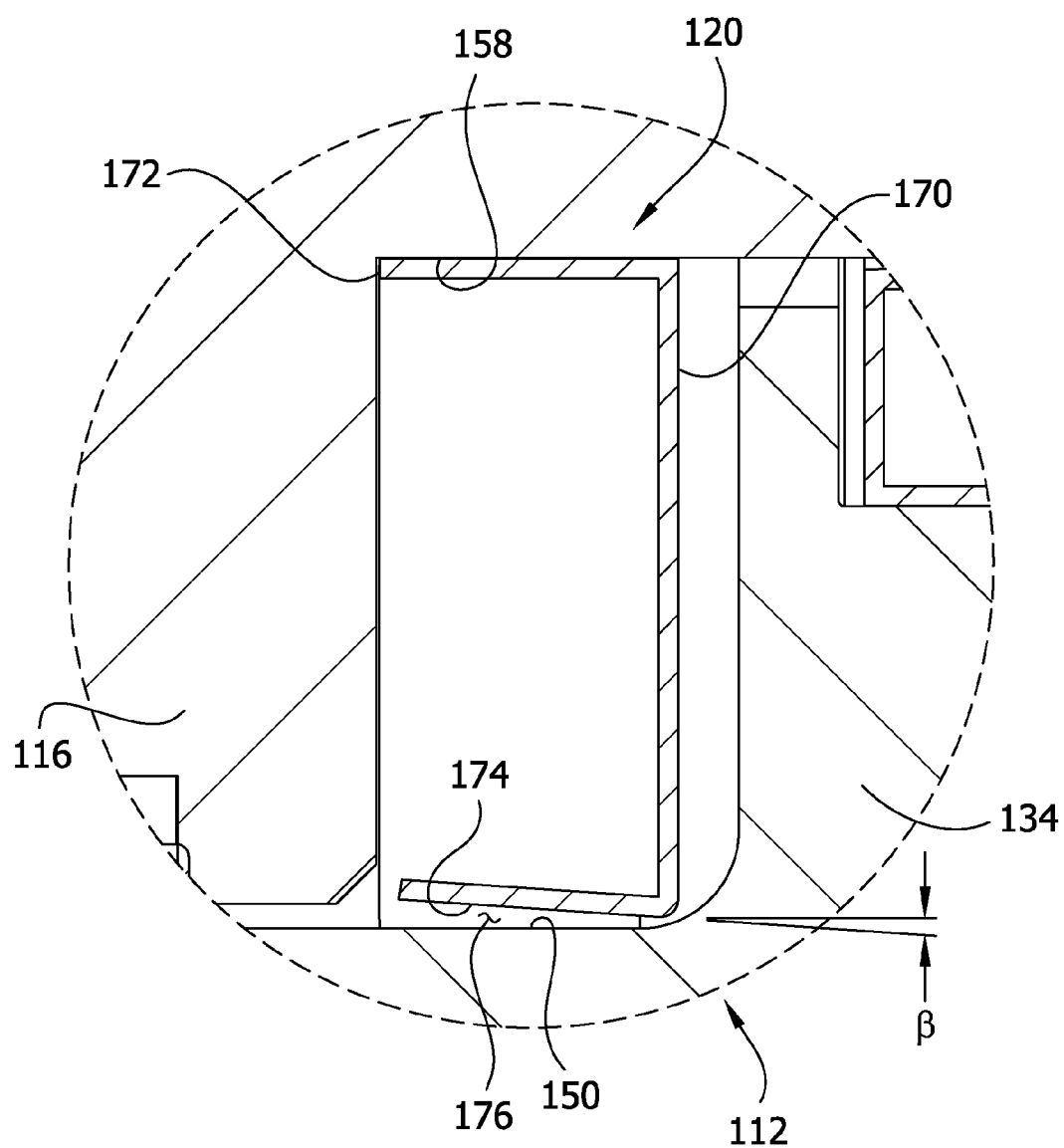
FIG. 11 is detail of a portion of FIG. 9.

Referring to FIG. 11, in the illustrated embodiment, the outer wall 182 of the seal 120 defines the gap surface 174. The outer wall 182 is oriented such that the gap surface 174 slopes radially inward from the bearing side 170 to the opening side 172. The sloped gap surface 174 defines a clearance gap 176 that has an axially varying width. The illustrated gap surface 174 is sloped at an angle β of about 1.35° relative to the central axis A' of the bearing 114, but the gap surface 174 may be sloped at other angles without departing from the scope of the present invention. For example, in some embodiments the gap surface 176 may be sloped at an angle β relative to the central axis A' of the bearing 114 in a range of about 1.3° to about 5.0°.

The width of the clearance gap 176 increases in the axial direction extending from the bearing side 170 of the seal 120 to the opening side 172 of the seal. In the illustrated embodiment, the clearance gap 176 at the opening side 172 of the seal 120 has a width of about 0.02 inches. The clearance gap 176 at the bearing side 170 of the seal 20 has a width of about 0.01 inches. It is envisioned the clearance gap 176 may have other widths without departing from the scope of the invention. For example, in some embodiments, the clearance gap 176 has a width at the bearing side 170 of the seal 120 in a range of about 0.005 inches to about 0.025 inches. Further, in some embodiments, the clearance gap 176 has a width at the opening side 172 of the seal in a range of about 0.010 inches to about 0.050 inches.

Figure 12:
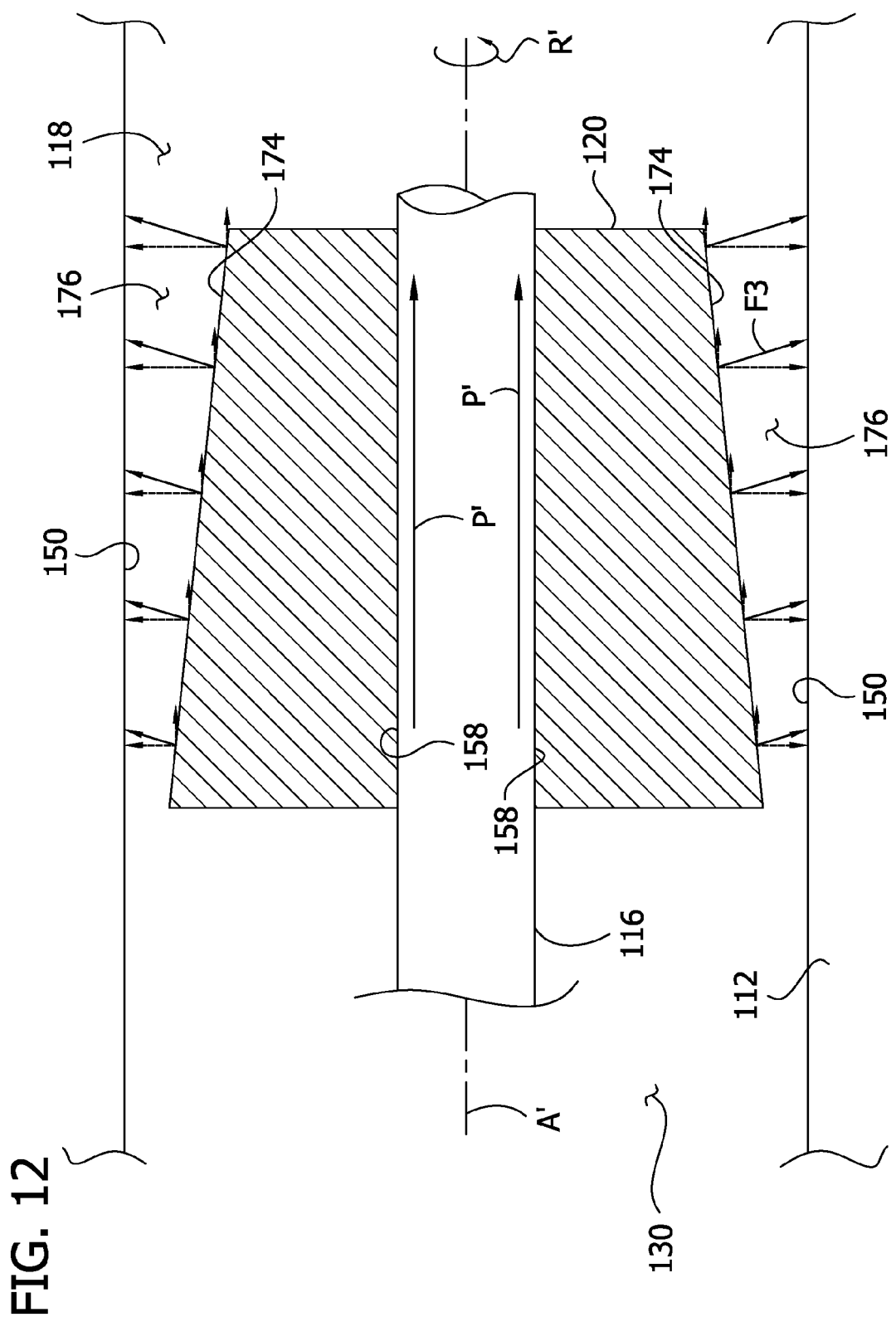
FIG. 12 is a schematic fragmentary cross section illustrating forces exerted on fluid in a gap between the seal and a housing of the bearing assembly of FIG. 8.

Referring to FIG. 12, the seal 120 is configured to generate a net axial pumping force in use that pumps fluid in the clearance gap 176 axially toward the exterior of the housing 112 in a pumping direction P'. In the illustrated embodiment, the shaft 116 rotates in the housing 112 in a rotational direction R'. Lubricant to the interior cavity 130 of the housing 112 fills the clearance gap 176 between the seal 120 and the shaft 116. As the shaft 116 rotates, the seal 120 rotates with the shaft and the housing 112 remains stationary, creating a moving boundary condition at the radially outward facing gap surface 174 and a non-moving boundary condition at the seal mounting surface 150. A velocity gradient forms in the fluid across the width of the clearance gap 176 ranging from the boundary at the radially outward facing gap surface 174 of the seal 120 where the fluid velocity equals the velocity of the gap surface to the boundary of the seal mounting surface 150 of the housing 112 where the fluid velocity is zero. The velocity gradient generates shear stress in the fluid. The shear stress in the fluid imparts a force F3 on the fluid in a direction normal to the sloped gap surface 175. The axial component of the force F3 normal to the gap surface 175 pushes lubricant in the pumping direction P'. Even though the gap surface 174 is only slightly angled relative to the central axis of the bearing 114, the net effect on the lubricant is strong enough to pump the lubricant in the pumping direction because the shaft 116 rotates at a relatively high speed. Contaminants in the clearance gap 176 are pumped with the lubricant in the pumping direction P' away from the interior cavity 30.

Figure 13:
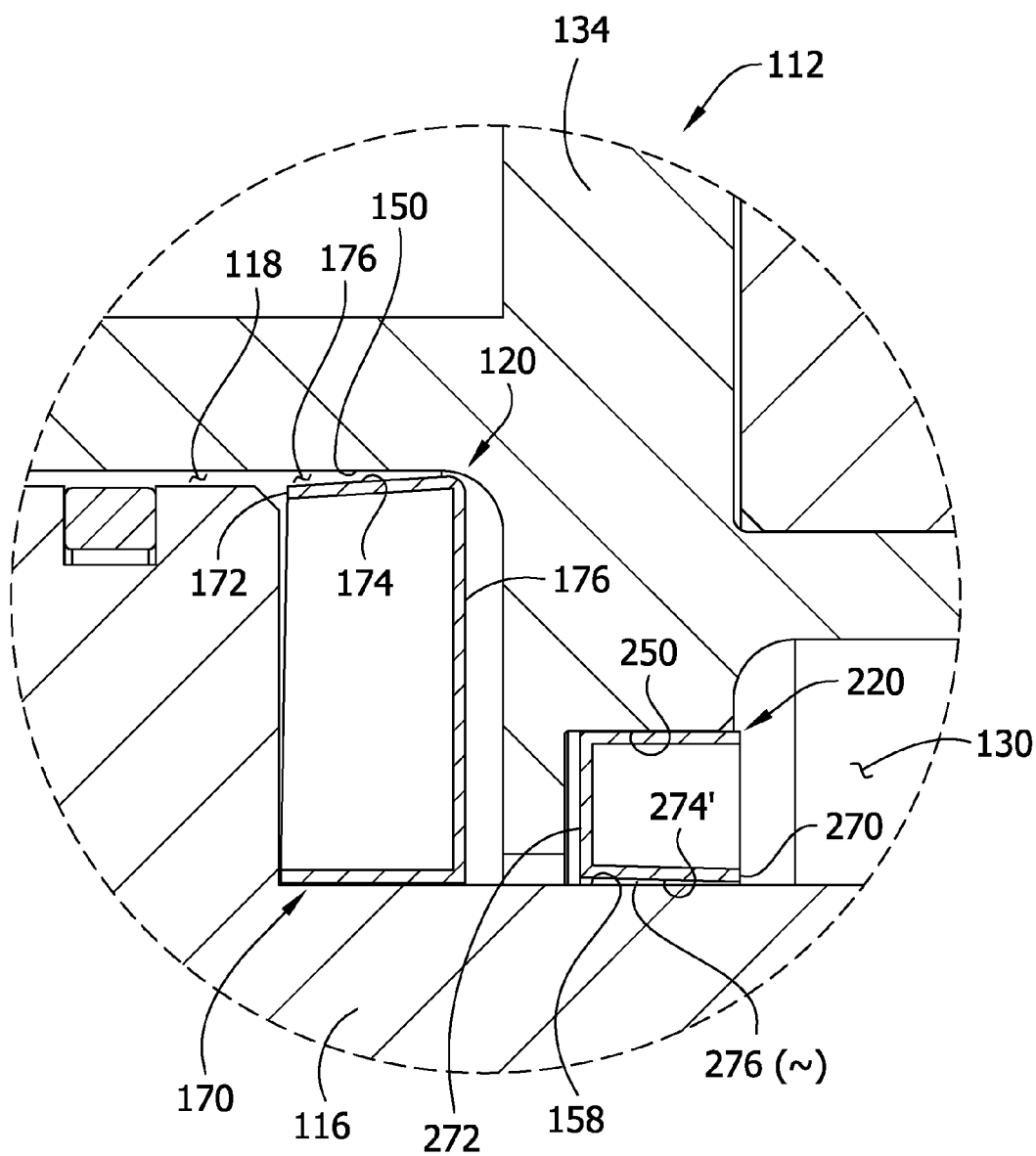
FIG. 13 is detail of a portion of FIG. 9.

Referring to FIG. 13, the illustrated bearing assembly 110 includes not only the primary labyrinth seal 120, but also a secondary labyrinth seal 220 for additional sealing. The secondary labyrinth seal 220 is substantially similar to the labyrinth seal 20 of the bearing assembly 10 in its construction and function. Like the seal 20 of the first embodiment, the secondary seal 220 is a non-contact seal mounted on the housing 112 and spaced from the shaft 116. Like the seal 20 of the first embodiment, the secondary seal 220 is positioned axially between the interior cavity 130 and the exterior of the housing 112 so it surrounds the shaft 116. Moreover, the secondary seal 220 is mounted in a seal mounting surface 250 of the housing 112 and is fixed in position relative to the housing. The seal 220 includes the inwardly facing gap surface 274, which opposes the radially outward facing surface 158 of the shaft 116 and defines the clearance gap 276. The gap surface 274 slopes radially outward from a bearing end 270 of the seal 220 to an opening end 272 of the seal. The gap surface 274 is angled relative to the central axis A' of the bearing 114. The clearance gap 276 is wider at the opening end 272 of the seal 220 than and the bearing end 270 of the seal. The clearance gap 276 may have the same dimensions as the clearance gap 76 of the bearing assembly 10.

In use, the secondary labyrinth seal 220 is configured to inhibit contaminants from entering the interior cavity 130 of the housing 112 and damaging the bearing 114. Like the seal 20 of the bearing assembly 10 of the first embodiment, when the shaft 116 rotates in the housing 112, the relative movement between the radially outward facing surface 158 of the shaft and the gap surface 274 of the seal 220 pumps the lubricant and contaminants contained in it away from the interior cavity 130. In the illustrated bearing assembly 110, the seal 220 functions as a secondary seal arranged in series with the primary seal 120 to inhibit contaminants from entering the interior cavity 130. Contaminants that overcome the pumping action of the primary seal 120 to pass through the clearance gap 176 are directed away from the interior cavity 130 by the secondary seal 220. Thus, the combination of a first labyrinth seal 120 and a second labyrinth seal 220 arranged in series is thought to provide additional protection against the ingress of contaminants into the interior cavity 130 than either one of the seals acting alone. It is contemplated that more than two labyrinth seals may be arranged in series between an interior cavity of a bearing assembly housing and an exterior of the bearing assembly to provide additional sealing of the interior cavity. Moreover, though the illustrated embodiment uses one shaft-mounted seal 120 and one housing-mounted seal 220, it is envisioned that other embodiments may use two or more shaft-mounted seals or two or more housing-mounted seals without departing from the scope of the invention. Likewise, in other embodiments, a housing-mounted seal may be positioned closer to the exterior of the housing than a shaft-mounted seal without departing from the scope of the present invention.

In view of the foregoing, it can be seen that one or more labyrinth seals of relatively simple construction can be used to seal the shaft opening of a bearing assembly around a shaft. By using a labyrinth seal that defines a sloped gap surface that is wider on an end closer to the exterior of the bearing assembly housing and narrower on an end closer to the interior cavity of the bearing assembly, a bearing assembly can be configured to pump lubricant away from the interior cavity of the bearing assembly, even when the interior cavity of the bearing assembly is not optimally pressurized. Further, the sloped gap surface pumps (i.e., forces or pushes) lubricant through the clearance gap and away from the interior cavity of the bearing assembly to purge lubricant from the interior cavity, allowing fresh lubricant to enter the interior cavity during subsequent lubrication cycles. Moreover, the pumping action of the labyrinth seal of the present invention prevents contamination from entering the clearance gap from outside the housing to prevent contamination migrating into the interior cavity and damaging the bearing. Thus, the labyrinth seal reduces a potential for bearing damage from contamination and increases bearing assembly life.

The gap surface of the labyrinth seal may be a radially outward facing surface spaced from an opposing surface of a bearing housing or a radially inward facing surface spaced from an opposing surface of a rotatable shaft of the bearing assembly. In either case, the relative orientation and position of the gap surface and the opposing surface is configured to pump lubricant in the clearance gap away from the interior cavity of the bearing assembly as the shaft rotates, thereby inhibiting the ingress of contaminants into the interior cavity where they might damage the bearing.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A bearing assembly, comprising:
a housing having an interior cavity adapted to connect with a lubricant source, an opening extending from the interior cavity to an exterior of the housing, an inward facing seal mounting surface, and an inward facing bearing seat;
a bearing positioned in the interior cavity of the housing and having a central axis, said bearing including an outer race mounted in the inward facing bearing seat of the housing and an inner race centered on the central axis and freely rotatable in the outer race;
a shaft mounted in the inner race of the bearing for rotation with the inner race about the central axis of the bearing, said shaft having a radially outward facing surface extending along the shaft from the interior cavity through the opening to the exterior of the housing; and
a seal mounted around the radially outward facing surface of the shaft and positioned axially along the shaft between the interior cavity of the housing and the exterior of the housing to inhibit contaminants from entering the interior cavity of the housing and damaging the bearing, the seal including an annular body having a bearing side facing the bearing and an opening side opposite said bearing side, the seal further including a gap surface facing a corresponding surface consisting of the radially outward facing surface of the shaft, said gap surface being spaced from the corresponding surface by a clearance gap having a predetermined axially varying width, said width of the clearance gap increasing from the bearing side to the opening side to direct fluid in the clearance gap away from the interior cavity as the shaft rotates relative to the housing.

2. A bearing assembly as set forth in claim 1, wherein the gap surface is sloped at angle relative to the central axis in a range of about 1.3° to about 5.0°.

3. A bearing assembly as set forth in claim 2, wherein the gap surface is sloped at an angle of about 1.35° relative to the central axis.

4. A bearing assembly as set forth in claim 1, wherein the clearance gap at the opening side of the seal has a width in a range of about 0.010 inches to about 0.050 inches and the clearance gap at the bearing side of the seal has a width in a range of about 0.005 inches to about 0.025 inches.

5. A bearing assembly as set forth in claim 4, wherein the clearance gap at the opening side has a width of about 0.02 inches and the clearance gap at the bearing side has a width of about 0.01 inches.

6. A bearing assembly as set forth in claim 1, wherein the seal comprises a metal.

7. A bearing assembly as set forth in claim 1, wherein the shaft is adapted to rotate at a speed in a range of about 50 rpm to about 2000 rpm.

8. A bearing assembly as set forth in claim 1, wherein the seal comprises an end wall extending from an inner end to an outer end, an inner wall extending axially from the inner end of the end wall, and an outer wall extending axially from the outer end of the end wall, said outer wall being spaced from said inner wall by an annular space.

9. A bearing assembly as set forth in claim 8, wherein the end wall of the seal is positioned at the opening side of the seal.

10. A bearing assembly, comprising:
a housing having an interior cavity adapted to connect with a lubricant source, an opening extending from the interior cavity to an exterior of the housing, an inward facing seal mounting surface, and an inward facing bearing seat;
a bearing positioned in the interior cavity of the housing and having a central axis, said bearing including an outer race mounted in the inward facing bearing seat of the housing and an inner race centered on the central axis and freely rotatable in the outer race;
a shaft mounted in the inner race of the bearing for rotation with the inner race about the central axis of the bearing, said shaft having a radially outward facing surface extending along the shaft from the interior cavity through the opening to the exterior of the housing; and
a first seal mounted around the radially outward facing surface of the shaft and positioned axially along the shaft between the interior cavity of the housing and the exterior of the housing to inhibit contaminants from entering the interior cavity of the housing and damaging the bearing, the first seal including an annular body having a bearing side facing the bearing and an opening side opposite said bearing side, the first seal further including a gap surface facing a corresponding surface consisting of the radially outward facing surface of the shaft or the inward facing seal mounting surface of the housing, said gap surface being spaced from the corresponding surface by a clearance gap having a predetermined axially varying width, said width of the clearance gap increasing from the bearing side to the opening side to direct fluid in the clearance gap away from the interior cavity as the shaft rotates relative to the housing, and
a second seal mounted around the radially outward facing surface of the shaft, axially spaced from the first seal, and positioned axially along the shaft between the interior cavity of the housing and the exterior of the housing to inhibit contaminants from entering the interior cavity of the housing and damaging the bearing, the second seal including an annular body having a bearing side facing the bearing and an opening side opposite said bearing side, the second seal including a gap surface facing a second corresponding surface consisting of the radially outward facing surface of the shaft or the inward facing seal mounting surface of the housing, said gap surface being spaced from the second corresponding surface by a clearance gap having a predetermined axially varying width, said width of the clearance gap increasing from the bearing side to the opening side to direct fluid in the clearance gap away from the interior cavity as the shaft rotates relative to the housing.

11. A bearing assembly as set forth in claim 10, wherein the gap surface of said first seal faces the radially outward facing surface of the shaft.

12. A bearing assembly as set forth in claim 11, wherein the gap surface of said second seal faces the radially inward facing seal mounting surface of the housing.

13. A bearing assembly, comprising:
a housing having an interior cavity adapted to connect with a lubricant source, an opening extending from the interior cavity to an exterior of the housing, an inward facing seal mounting surface, and an inward facing bearing seat;
a bearing positioned in the interior cavity of the housing and having a central axis, said bearing including an outer race mounted in the inward facing bearing seat of the housing and an inner race centered on the central axis and freely rotatable in the outer race;
a shaft mounted in the inner race of the bearing for rotation with the inner race about the central axis of the bearing, said shaft having a radially outward facing surface extending along the shaft from the interior cavity through the opening to the exterior of the housing;
a seal mounted around the radially outward facing surface of the shaft and positioned axially along the shaft between the interior cavity of the housing and the exterior of the housing to inhibit contaminants from entering the interior cavity of the housing and damaging the bearing, the seal including an annular body having a bearing side facing the bearing and an opening side opposite said bearing side, the seal further including a gap surface facing the radially outward facing surface of the shaft, said gap surface being spaced from the radially outward facing surface of the shaft by a clearance gap having a predetermined axially varying width, said width of the clearance gap increasing from the bearing side to the opening side to direct fluid in the clearance gap away from the interior cavity as the shaft rotates relative to the housing.

14. A bearing assembly as set forth in claim 13, wherein the gap surface is sloped at angle relative to the central axis in a range of about 1.3° to about 5.0°.

15. A bearing assembly as set forth in claim 14, wherein the gap surface is sloped at an angle of about 1.35° relative to the central axis.

16. A bearing assembly as set forth in claim 13, wherein the clearance gap at the opening side of the seal has a width in range of about 0.010 inches to about 0.050 inches.

17. A bearing assembly as set forth in claim 16, wherein the clearance gap at the opening side has a width of about 0.02 inches.

18. A bearing assembly as set forth in claim 13, wherein the clearance gap at the bearing side of the seal has a width in a range of about 0.005 inches to about 0.025 inches.

19. A bearing assembly as set forth in claim 18, wherein the clearance gap at the bearing side has a width of about 0.01 inches.

* * * * *